US012712789B2

(12) United States Patent
Amer

(10) Patent No.: US 12,712,789 B2
(45) Date of Patent: Aug. 18, 2026

(54) SERVICE CAPACITY, ELIGIBILITY, AND RESOURCE ALLOTMENT MODELING

(71) Applicant: T-Mobile USA, Inc., Bellevue, WA (US)

(72) Inventor: Mohamed Abdullah Amer, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 351 days.

(21) Appl. No.: 18/602,796

(22) Filed: Mar. 12, 2024

(65) Prior Publication Data

US 2025/0293951 A1 Sep. 18, 2025

(51) Int. Cl.
*H04L 41/50* (2022.01)
*G06F 18/2415* (2023.01)
*G06Q 30/0202* (2023.01)
*H04L 41/147* (2022.01)

(52) U.S. Cl.
CPC .......... *H04L 41/50* (2013.01); *G06F 18/2415* (2023.01); *G06Q 30/0202* (2013.01); *H04L 41/147* (2013.01)

(58) Field of Classification Search
CPC ... H04L 41/50; H04L 41/147; G06F 18/2415; G06Q 30/0202
See application file for complete search history.

(56) References Cited

U.S. PATENT DOCUMENTS 5,822,410 A 10/1998 Mccausland et al.
8,355,945 B1 1/2013 Lall et al.
8,630,892 B2 1/2014 Bhalla et al.
9,465,548 B1 10/2016 Hrischuk et al.
10,762,517 B2 9/2020 Vadakattu et al.
10,785,123 B2 * 9/2020 Gonguet ................. H04L 41/16
10,949,771 B2 3/2021 Gonguet et al.
11,240,125 B2 2/2022 Sridhar et al.
11,392,968 B2 7/2022 Nielsen et al.
(Continued)

FOREIGN PATENT DOCUMENTS

CN 101742476 B 8/2012
CN 110837931 B 1/2023

*Primary Examiner* — Soe Hlaing

(74) *Attorney, Agent, or Firm* — Ashurst Perkins Coie US LLP

(57) ABSTRACT

A method can include dividing a service area into service grid elements. A method can include determining, using a throughput model, a predicted throughput of a resource-limited service, the throughput model comprising a regression model configured to receive network data indicative of network performance and to output the predicted throughput. A method can include determining, using a churn model, a predicted churn time of a subscriber, the churn model comprising a classification model configured to receive customer data indicative of a likelihood that a customer terminates service and to output the predicted churn time. A method can include providing the predicted throughput and predicted churn time to an eligibility determination engine. A method can include determining an eligibility for the resource-limited service for each service grid element by determining that the predicted throughput is above a threshold value and the predicted churn time is above a threshold value.

20 Claims, 11 Drawing Sheets

(56) References Cited

U.S. PATENT DOCUMENTS

| | | | | |
|---|---|---|---|---|
| 11,514,317 | B2 | 11/2022 | Lakshmikantha et al. | |
| 11,538,049 | B2 | 12/2022 | Gold et al. | |
| 2011/0295649 | A1 | 12/2011 | Fine et al. | |
| 2015/0310336 | A1* | 10/2015 | Sotela | G06N 20/20 706/46 |
| 2015/0371163 | A1 | 12/2015 | Noh et al. | |
| 2016/0203509 | A1 | 7/2016 | Sharp et al. | |
| 2019/0266622 | A1 | 8/2019 | Turnbull et al. | |
| 2019/0268283 | A1 | 8/2019 | Mukherjee et al. | |
| 2020/0327449 | A1 | 10/2020 | Tiwari et al. | |
| 2022/0164593 | A1 | 5/2022 | Singla et al. | |
| 2022/0377582 | A1 | 11/2022 | Sakamoto et al. | |
| 2023/0229516 | A1 | 7/2023 | Sawal et al. | |
| 2023/0275973 | A1 | 8/2023 | Sakamoto et al. | |
| 2024/0031850 | A1 | 1/2024 | Yan et al. | |
| 2024/0098575 | A1* | 3/2024 | Singh | H04W 28/16 |

* cited by examiner

SERVICE CAPACITY, ELIGIBILITY, AND RESOURCE ALLOTMENT MODELING

BACKGROUND

When rolling out a new service, such as an online platform, wireless telecommunications network, and so forth, it can be significant to consider the capabilities and capacity of the service. For example, a new online platform can have limited server capacity and can become overloaded if too many users sign up, or a wireless telecommunications network can have limited network capacity that can become overloaded if there are too many simultaneous users. Thus, for example, in some cases, online platforms or wireless telecommunications services will have a ramp up period during which sign ups are limited. For example, sign ups can be offered on an invite-only basis so that the number of users (and consequently, demands for resources) can be controlled or new signups can be closed once a pre-determined limit is reached.

As another example, services can be rolled out in specific markets rather than made available to the general public. Even after a general rollout, it can be important to control the number of users, overall user demand, user demand in specific areas, and so forth, to ensure that performance of the service remains acceptable. For example, in the context of wireless telecommunications networks, it can be significant to limit user demand for bandwidth.

Getting new subscribers for a service can be a difficult and expensive process. For example, a company can spend significant money on advertising to reach new subscribers. Once interested individuals are found, converting them to subscribers can also have significant costs. For example, equipment may need to be shipped to a customer, a technician may need to be dispatched to a customer's location, and so forth. If a subscriber is dissatisfied with the service and terminates their subscription, a company can lose money.

In the case of internet service, several issues can make customers more likely to leave the service ("churn"). Customers who experience slow speeds or frequent outages can be more likely to leave, especially if there are competing providers.

BRIEF DESCRIPTION OF THE DRAWINGS

Detailed descriptions of implementations of the present invention will be described and explained through the use of the accompanying drawings.

Figure 1:
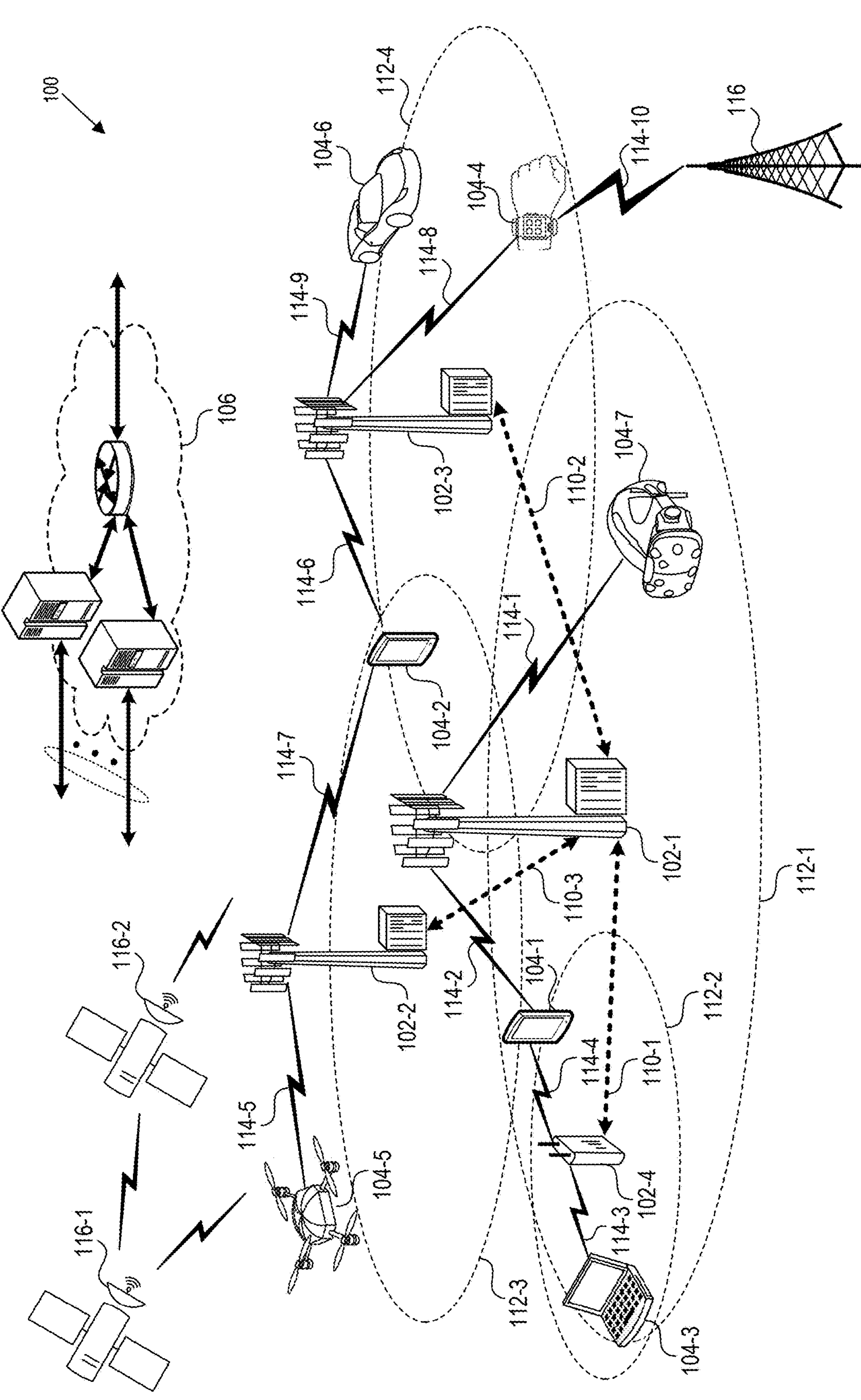
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

When rolling out new resource-limited services such as home wireless high speed internet (referred to herein as "HSI"), it can be important to determine capacity and performance levels before offering the product to a customer. HSI can operate on a cellular network. Depending on how cellular networks are deployed and operate, HSI may be more or less suitable depending on a variety of factors, such as distance from a cell site, obstructions that can interfere with wireless signals, network capacity, network demand, and so forth. For example, a cell site can have a maximum capacity. When the capacity is exceeded, performance can slow, connections can drop or timeout, and so forth, resulting in degraded customer experience.

In conventional approaches, a network operator implements functionality to provide HSI or another resource-limited service in a geographic area and proceeds to make the HSI service available to customers in that area. However, there can be several problems with this approach. For example, if HSI service is being newly rolled out, the network operator may rely on data from other devices on their network, such as smartphones, to determine whether or not performance will be acceptable for HSI. While this can provide valuable information, smartphone network usage can be significantly different when compared to HSI network usage by other types of devices. For example, home internet users may have several devices making use of the HSI connection, may be more likely to transfer large files or stream large amounts of audio of video, may be more likely to engage in online gaming with low latency demands, and so forth. HSI users may expect different quality of service. For example, a smartphone user may expect more interruptions or glitches during a video call than a home internet user would typically expect to encounter. Reliance on data from smartphones can fail to fully account for network capacity, performance limitations, and other issues that can significantly impact the experience of HSI customers.

In some cases, expected growth, regulatory commitments, and other factors can be considered when determining eligibility for HSI. For example, if the load on a particular cell site is expected to grow significantly, for example because it is located in a neighborhood experiencing rapid growth, capacity limitations can be a significant problem. In some cases, a network operator can consider planned expansions, such as planned additional cell site deployments, upgrades to existing cell sites, and so forth. In some cases, the network operator may have made commitments to government entities regarding minimum performance levels, guaranteeing that it would offer surface to a minimum number of subscribers, or ensuring minimum quality of service to emergency services, which can limit the network operator's ability to offer HSI, which could result in an overall reduction in the network performance experienced by customers.

High speed internet has become an integral part of the daily lives of countless individuals, enabling access to entertainment, remote work, online gaming, information, video communication, and so forth. However, there are significant limitations with current high speed internet access approaches.

Conventionally, home high speed internet access (referred to herein as HSI) has been provided over physical connections such as cable, fiber optics, and DSL lines. However, many people live in rural areas or far from high speed wired communications infrastructure, which can mean that they are unable to access high speed internet at home, experience slower speeds than those in more densely populated areas or pay higher prices than those located in more densely populated areas. Satellite internet access has historically been an option for individuals who cannot obtain wired HSI, but satellite internet access has several drawbacks. For example, speeds can be relatively slow, latency can be unacceptably high, service may not be available during adverse weather, prices can be high, and data usage can be limited.

Wireless HSI presents one option for expanding access to those who cannot access wired HSI, as well as providing an additional option for those in areas with existing wired HSI infrastructure. The deployment of 5G networks has resulted in significantly increased network capacity, meaning that it is now viable to provide wireless HSI without overburdening a wireless network.

Wireless HSI offers several advantages. For example, users can connect to the internet from anywhere that has access to compatible wireless infrastructure, without requiring a technician to install equipment. This can also enable more rapid deployment, as users can simply plug in a gateway and quickly have HSI access. Wireless HSI can be cost-effective, as there is no need to run physical wires or cables over long distances to reach homes.

While wireless HSI offers many benefits, there are also significant limitations. For example, high user density in a specific area can lead to network congestion, which can result in reduced speeds and degraded performance, especially during peak hours. Interference from other electronic devices, blocking of signals by buildings, mountains, hills, and other features of the landscape can result in areas with limited connectivity. As described herein, while in some cases service can be provided despite poor connectivity, doing so can consume significant resources, limiting the number of users who can use the wireless HSI service. In some cases, wireless HSI can offer a satisfactory level of bandwidth. However, when there are many subscribers or subscribers are located long distances from cell sites, speeds can be reduced. Speeds may be acceptable to many users but may be too slow for heavy users who transfer large amounts of data over the internet or who rely on low latency connections, such as for real-time communications or gaming. Such issues may be especially pronounced as both individuals and businesses increasingly rely on cloud services such as video conferencing, cloud storage, and so forth.

It can cost a significant amount to gain a new subscriber to a wireless HSI service. For example, a user can need a gateway to access the wireless HSI service, may require support when initially setting up wireless HSI service, and so forth. Significant amounts can be spent on advertising to make potential subscribers aware of the wireless HSI service. In some cases, introductory pricing can be offered to new subscribers, which can reduce or eliminate the profitability of the wireless HSI service for a period of time after the new subscriber beings service.

Accordingly, it can be significant to take steps to ensure that when a subscriber begins wireless HSI service, they are satisfied with the service and maintain their subscription for a long period of time. If speeds are consistently poorer than the subscriber expects or there are frequent service interruptions or slowdowns, the subscriber may leave the service, particular in cases where the subscriber has other options for HSI access.

In some conventional approaches, eligibility determination for wireless HSI service is separate from churn estimation. Churn can be a measure of how long a subscriber is likely to maintain service before discontinuing the service.

There is a need to effectively model HSI eligibility, supportability, and churn to determine where HSI access should be offered and how many subscriptions should be offered. By combining eligibility and churn determination processes, better decisions can be made about offering HSI access.

Once it is determined that HSI access should be offered in a geographic area, it can be important to determine how many subscribers should be able to sign up for HSI access. As discussed in more detail herein, the number of subscribers can vary based on the demands of the subscribers, for example their expectations for lag, bandwidth, and so forth, as well as characteristics of the network. For example, subscribers located far from a cell site and/or with significant obstructions between the subscriber and the cell site can consume greater network resources to achieve the same performance as another subscriber who is located closer to the cell site or without significant obstructions.

A simple approach can be to simply provide access to those who will experience a desired level of performance while consuming the fewest network resources. However, in practice, such an approach can fail to consider other priorities of a wireless HSI provider. For example, such an approach can maximize the number of subscribers, but subscribers who can use the service with minimal network resource usage may also be more likely to be located in areas with greater options, including access to wired HSI services that can exceed the performance of wireless HSI. Such subscribers may be more likely to leave because they can obtain similar or better performance at competitive prices.

In some cases, a provider may want to expand access to underserved areas. While providing service to such areas can, in some cases, consume greater network resources, offering services in these areas can have significant benefits. For example, access to high speed internet can be greatly expanded when wireless HSI is offered to individuals who do not have access to wired HSI access. Individuals who do not live in underserved areas can benefit when they travel.

Churn rates can be lower in underserved areas. Thus, while it may cost more to provide the same amount of service in such areas as compared to more densely populated areas, such costs can be mitigated or even erased by the reduced costs incurred when subscribers join or leave a service.

In some implementations, the disclosed systems and methods use machine learning models to determine eligibility for wireless HSI. For example, a throughput machine learning model can process network performance information collected from, for example, wireless HSI gateways, smartphones, cell sites, and so forth to determine an predicted throughput in a given location. A churn model can process network performance information, customer attributes, customer support histories, care call logs, life cycle information, and so forth to determine an predicted time before a customer leaves a service. In some cases, commitments, company priorities, and/or growth data, among other types of information, can be used in determining eligibility. In some implementations, network information can include, for example, sector band data, sector vendor data, sector bandwidth data, sector block error rate, sector radio resource control data, sector carrier aggregation data, sector E-UTRAN New Radio dual connectivity data, sector standalone 5G data, sector physical resource block utilization data, sector rank indicator data, sector quality of service class identifier data, sector modulation and control stream data, cell band data, cell vendor data, cell bandwidth data, cell block error rate, cell radio resource control data, cell carrier aggregation data, cell E-UTRAN New Radio dual connectivity data, cell standalone 5G data, sector physical resource block utilization data, cell rank indicator data, cell quality of service class identifier data, cell modulation and control stream data, service grid element reference signal received power, service grid element reference signal received quality, high speed internet device speed, high speed internet device latency, high speed internet device signal-interference-noise ratio, high speed internet device received signal strength indicator, high speed internet device reference signal received power, high speed internet device reference signal received quality, high speed internet device uptime, and high speed internet device mode. In some implementations, decisions about which eligible areas to offer service in, and how many subscribers to allow in an eligible area, can be approached as an optimization problem. In some embodiments, mixed integer linear programming can be used to optimize the allotment of available network resources in different areas.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
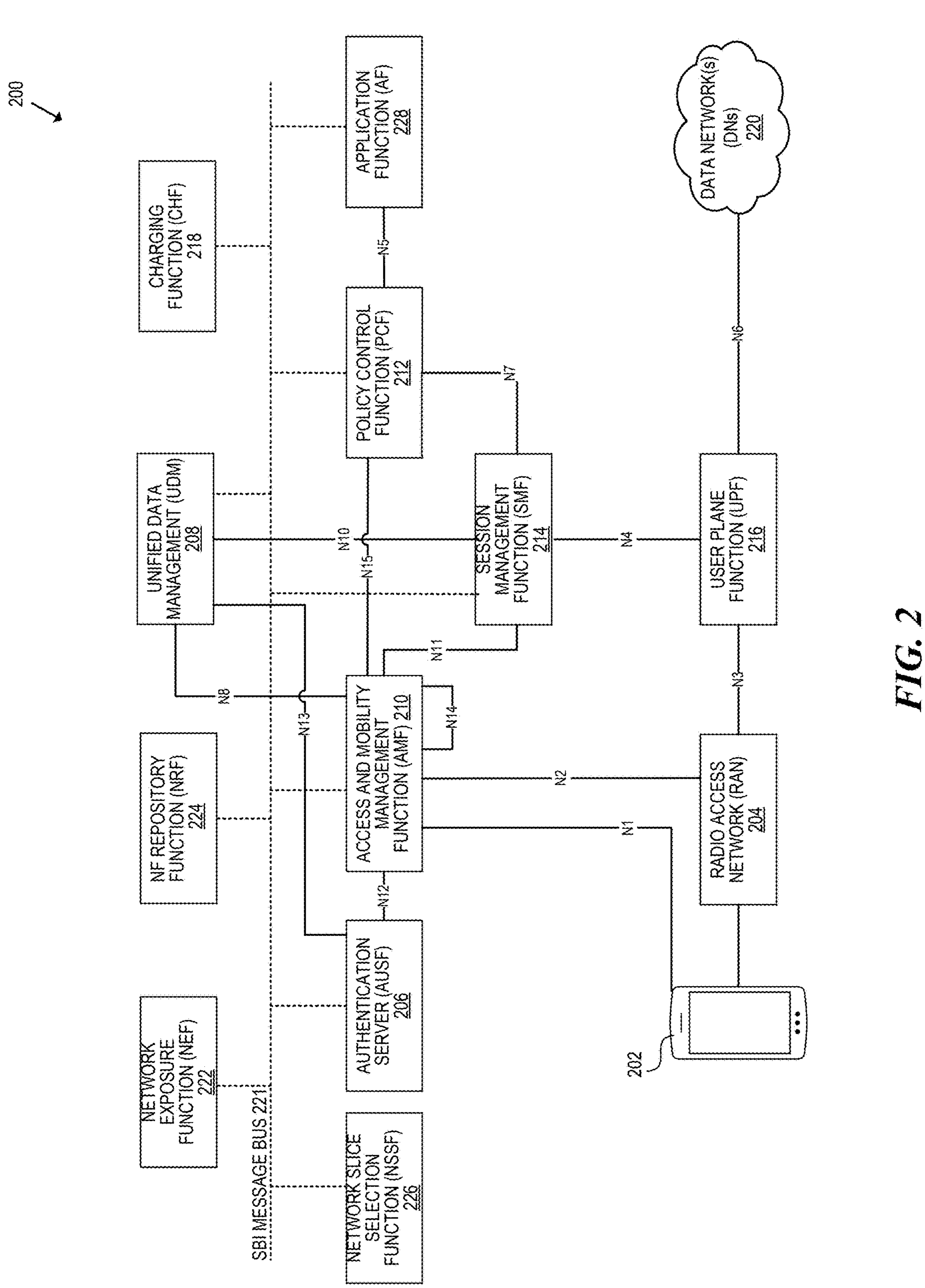
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

HSI Eligibility Determination

Analyzing network performance when determining HSI eligibility can present many challenges. For example, when an HSI gateway pings a tower, it can produce a cell reading indicating device throughput (e.g., received signal received power (RSRP) and/or other metrics). Cells can be organized into groups (referred to herein as sectors). In some cases, cells can pull speed/performance from other cells within the sector. Thus, the information reported by the gateway may not be for a particular cell but instead can be sector-level measurements. In some cases, network key performance indicators (KPIs) can be provided at a cell level. The KPIs can include data related to, for example, antenna congestion, speed, and so forth. A lack of granular gateway speed data and cell-specific telemetry can make modeling network performance challenging.

Figure 3B:
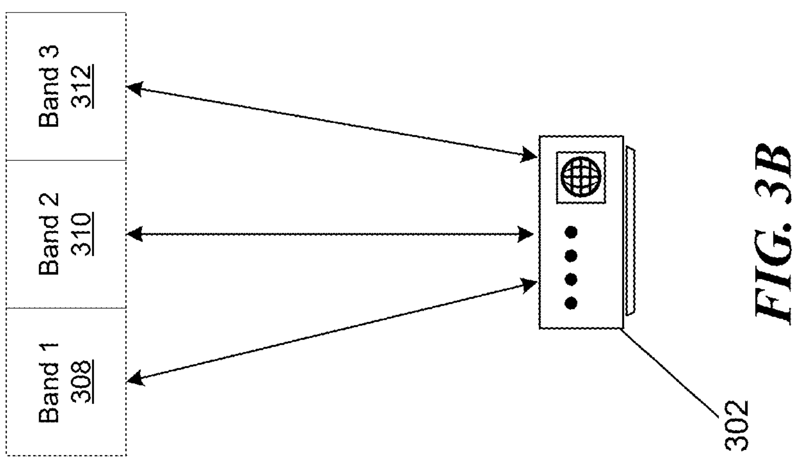
FIGS. 3A and 3B illustrate connectivity of a high speed internet gateway.
Figure 3A:
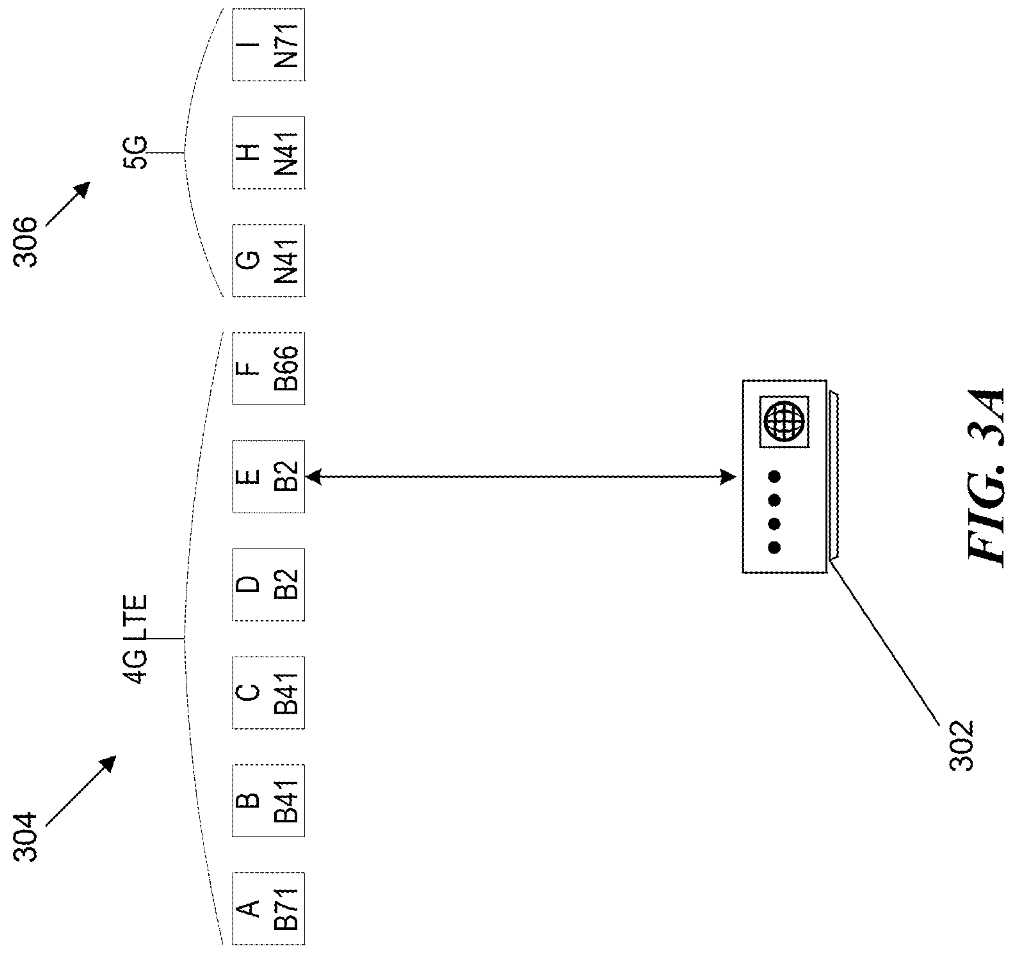

As shown in FIG. 3A, in some cases, a device can connect to a first cell, but can take advantage of many different cells. In FIG. 3A, there is an HSI gateway 302, a plurality of 4G cells 304, and a plurality of 5G cells 306. The HSI gateway 302 can be connected to one cell (e.g., cell E on band B2), but can utilize the network capacity of cells A, B, C, D, F, G, H, and I. One cell can be a primary cell and other cells can be secondary cells.

Even if only one cell is used, carrier aggregation can mean that multiple carriers or frequency bands are used. For example, as shown in FIG. 3B, the HSI gateway 302 is utilizing Band 1 308, Band 2 310, and Band 3 312. One of the bands can be a primary band and other bands can be secondary bands.

In some cases, an HSI gateway can be connected to multiple 4G and 5G cells, combining carrier aggregation and E-UTRAN New Radio Dual Connectivity (ENDC), also referred to as non-standalone 5G or NSA 5G.

While the approaches shown in FIGS. 3A and 3B can be beneficial to improving performance, such approaches can make analyzing network performance for a particular cell or a particular band difficult.

Figure 4:
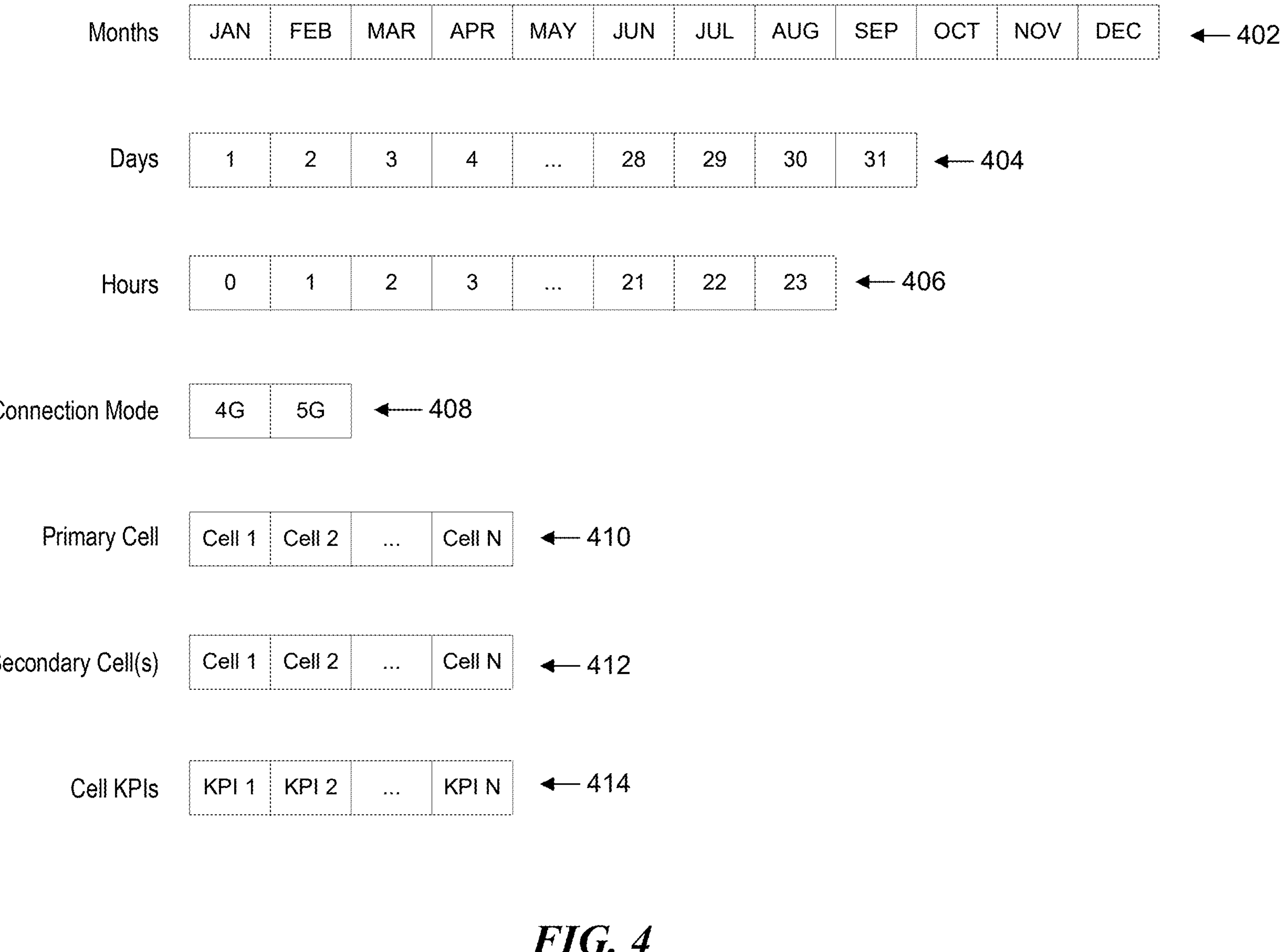
FIG. 4 illustrates aspects of performance and network data according to some implementations.

FIG. 4 further illustrates challenges associated with collecting network performance data. Performance can vary based on, for example, month, day, hour, connection mode, primary cell, secondary cell, and so forth. Each cell can have one or more KPIs associated therewith. The KPIs can be measured daily, hourly, or on any other timeframe. In some cases, some KPIs may not be collected at regular intervals but can instead be collected only when requested. As shown in FIG. 4, performance data can be broken into months 402 (e.g., twelve months), days 404, hours 406, connection modes 408 (e.g., 4G or 5G), primary cell 410, one or more secondary cells 412, and cell KPIs 414. KPIs can include, for example, throughput, utilization, number of users, MIMO information, traffic volume, and so forth.

Figure 5:
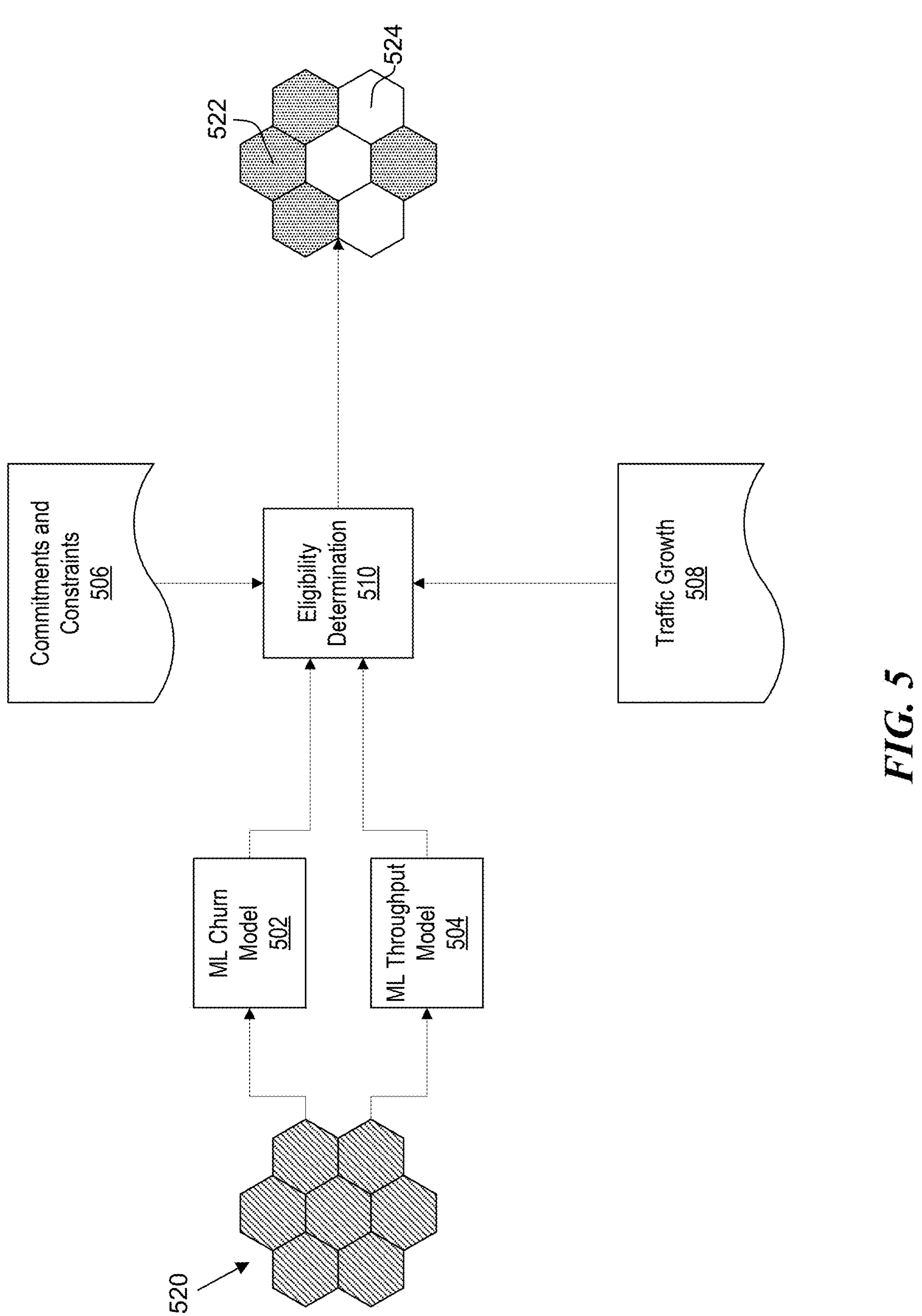
FIG. 5 is a flowchart that illustrates a process for determining wireless HSI eligibility according to some implementations.

FIG. 5 is a diagram that illustrates a process for determining wireless HSI eligibility according to some implementations. Starting with a plurality of service grid elements 520, the process of FIG. 5 can produce an output indicating eligible service grid elements 522 and ineligible service grid elements 524.

Data for the plurality of service grid elements 520 can be fed into a churn model 502 and a throughput model 504. The throughput model 504 can be used to determine a predicted network performance, while the churn model 502 can be used to determine a predicted churn time. In some implementations, the throughput model 504 can be a regression model. In some implementations, the churn model 502 can be a classification model. For example, the churn model 502 can classify whether or not a subscriber is likely to churn in a given time period (e.g., 0-30 days, 31-180 days, 181-365 days, greater than 365 days, etc.). The predefined time periods can be adjusted, for example, based on the costs of acquiring a new subscriber, the time required to obtain a new subscriber, the cost of retention efforts, and so forth. The outputs of the churn model 502 and the throughput model 504 are provided to an eligibility determination engine 510. In some implementations, the eligibility determination module can receive additional inputs. For example, in some implementations the eligibility determination engine 510 can be provided with commitments and constraints data 506, traffic growth data 508, or both. The commitments and constraints data 506 can include external constraints (e.g., commitments to regulatory agencies such as the Federal Communications Commission), internal constraints (e.g., limitations imposed by the wireless telecommunications company on itself), or both. The traffic growth data 508 can include historical growth data, projected growth data, or both.

The eligibility determination module can determine that a service grid element is eligible if the service grid element has a predicted throughput above (or below) a threshold value and a predicted churn time above (or below) a threshold value. In some implementations, the eligibility determination module excludes an otherwise eligible service grid element if, for example, the commitments and constraints indicates that the service grid element should not be eligible (e.g., because of network constraints, commitments to regulatory agencies, etc.) and/or if traffic growth data indicates that the service area element is likely to reach capacity, come within a threshold value of reaching capacity, or otherwise become unable to support wireless HSI.

The output of the eligibility determination engine 510 can be eligible service grid elements 522 and ineligible service grid elements 524. As described in more detail herein, while the eligible service grid elements 522 meet eligibility requirements for wireless HSI service, this does not mean that service will actually be offered in each of the eligible service grid elements. Rather, the eligibility determination engine 510 can be used to eliminate service grid elements where growth rates, constraints, commitments, expected performance, expected churn, or any combination thereof would make it undesirable to offer service. As described in more detail, additional processing can be carried out to determine in which of the eligible service grid elements 522 to offer service, as well as how to divide available wireless HSI service among the eligible service grid elements 522.

Figure 6:
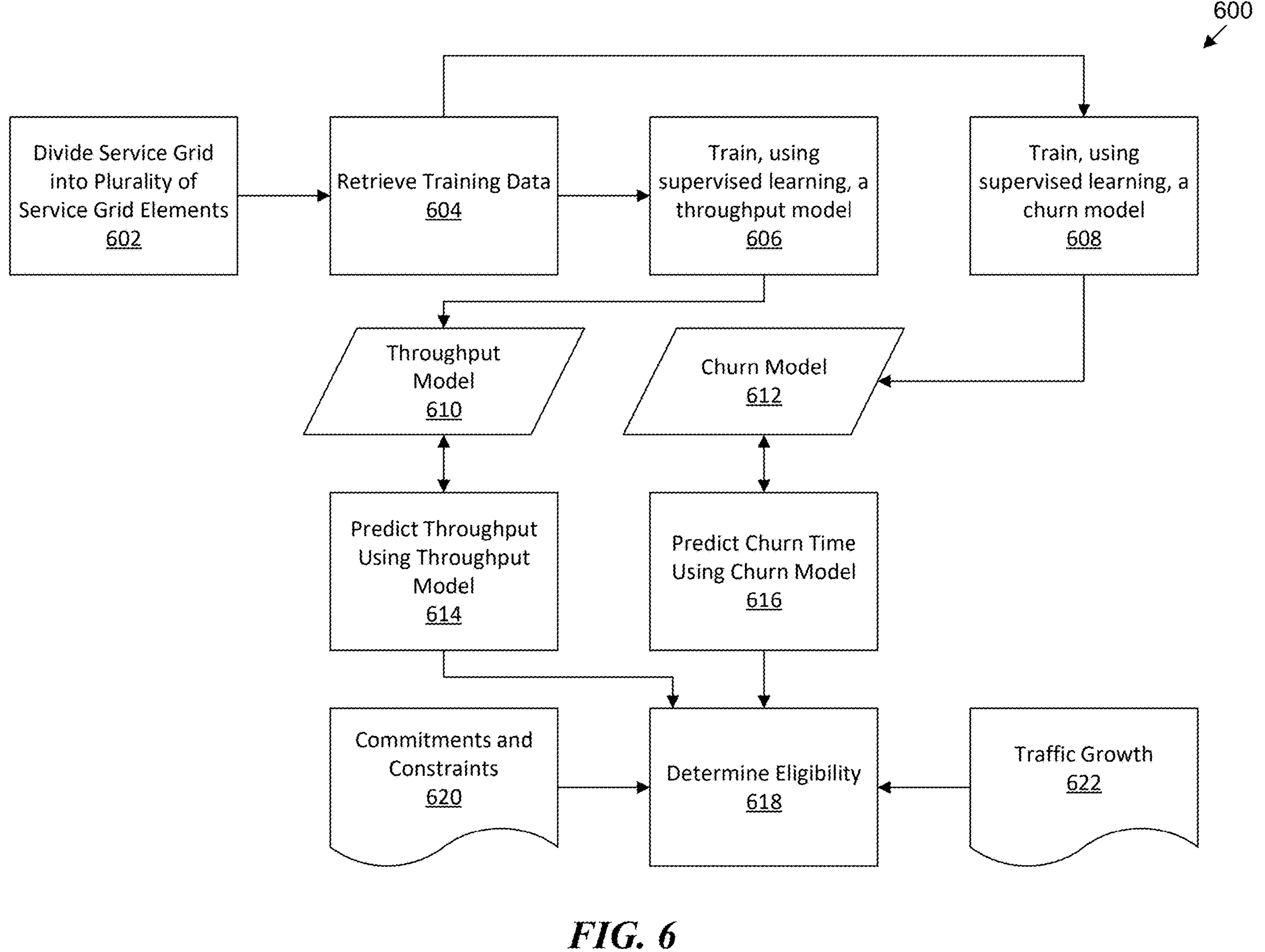
FIG. 6 is a flowchart that illustrates an example process for training and deploying throughput and churn models to determine wireless HSI eligibility according to some implementations.

FIG. 6 illustrates an example process 600 for training and deploying throughput and churn models to determine wireless HSI eligibility according to some implementations. The process 600 can be carried out on a computing system. At step 602, the computing system can divide a service grid into a plurality of service grid elements. An area covered by a particular cell site can be divided into a plurality of service grid elements. At step 604, the system can receive training data. The training data can include network performance data, customer service data (e.g., customer attributes, call volume, churn rates, etc.), and so forth. At step 606, the computing system can train a throughput model 610 using supervised learning. For example, the throughput model can be trained to predict speed based on other network parameters, and speed values can be known in the training data. At step 608, the computing system can train a churn model 612 using supervised learning. For example, the churn model 612 can be trained to predict churn, and churn can have known values in the training data.

The throughput model 610 and churn model 612 can be used in determining eligibility for wireless HSI access. At step 614, the computing system can, given a service grid element, predict throughput using the throughput model 610. At step 616, the computing system can, for the service grid element, predict a churn time using the churn model 612. At step 618, the computing system can determine wireless HSI eligibility for the service grid element using the predicted throughput, the predicted churn time, commitments and constraints 620, and traffic growth 622.

As mentioned above, after determining eligible service area elements, further processing can be carried out to determine in which service area elements service is to be offered and the number of subscriptions to offer in each service area element. The number of users (e.g., the number of subscribers) per service area element can be determined by, for example, optimizing for a maximum number of signups, minimum churn, maximum supportability, business priority, robust supportability, or other factors.

Within a sector, a wireless telecommunications network can support a maximum number of physical resource blocks (PRBs). Modulation coding schemes (MCSs) can be used to determine how data is transmitted over the wireless telecommunications network. An MCS is a set of parameters that determine modulation and error correction approaches to optimize data rate and reliability. In wireless communications, noise, interference, and other issues can result in transmission errors. It can be significant to correct these errors. An MCS combines specific modulation techniques and error correction approaches. An MCS can be characterized by, for example, modulation order, coding rate, and other parameters. The coding rate can indicate redundancy in transmitted bits. Generally, higher MCS values have higher throughput, but at a cost of potentially reduced reliability. Lower MCS values, on the other hand, typically have lower throughput but with greater reliability. More PRBs can be required to achieve the same throughput with a lower MCS than with a higher MCS. Typically, lower MCS values are used when a gateway is located far from a cell site or when there is greater radio interference or disruption of radio signals.

Figure 7:
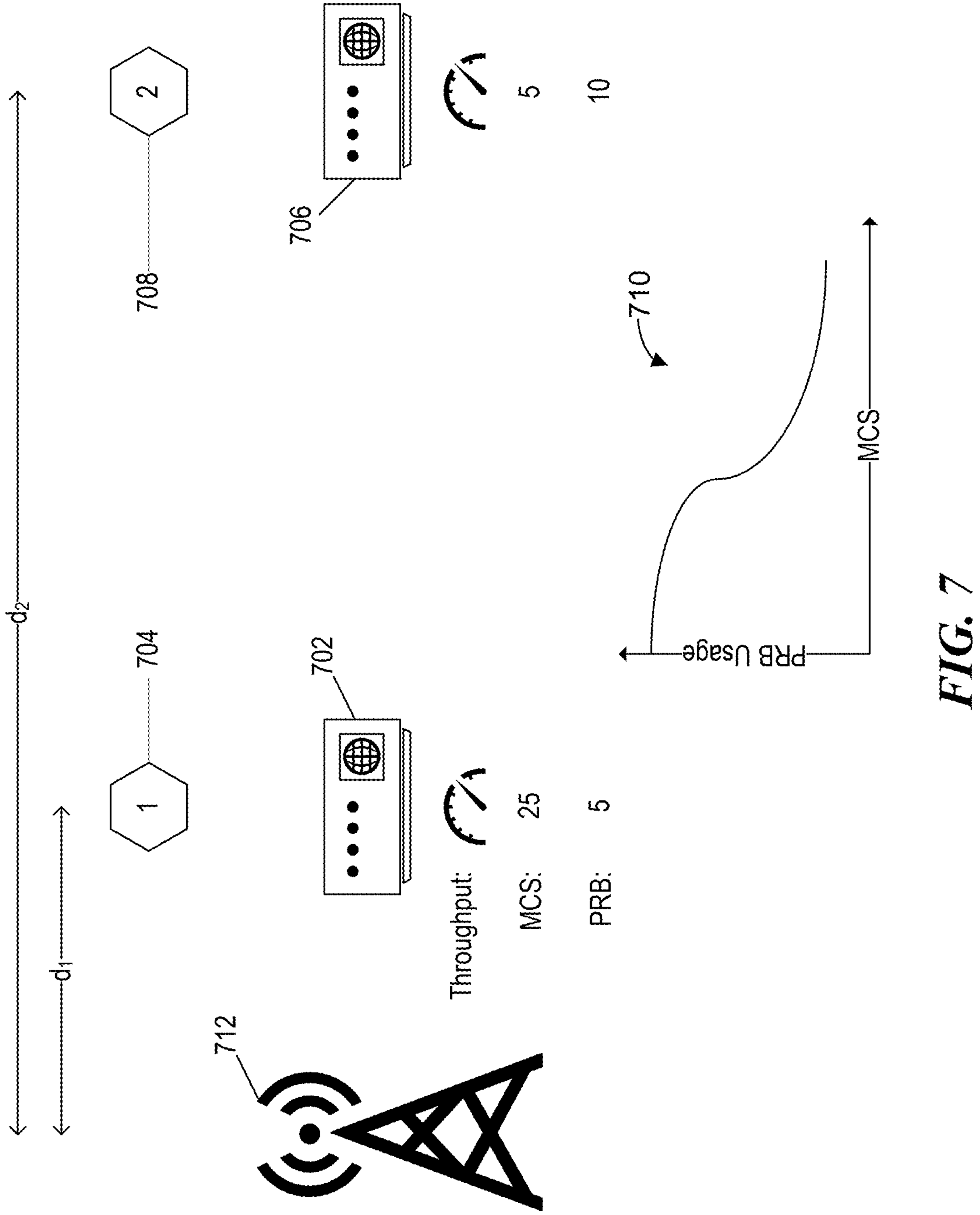
FIG. 7 is a diagram that schematically illustrates network resource consumptions according to some implementation.

FIG. 7 is a diagram that illustrates the difference in network resources (e.g., PRBs) required to achieve the same throughput in a first service area element 704 and second service area element 708. In FIG. 7, a first gateway 702 is located in the first service area element 704, and a second gateway 706 is located in the second service area element 708. In FIG. 7, the first service area element 704 is located a distance $d_1$ from a cell site 712, and the second service area element 708 is located a distance $d_2$ from the cell site 712, where $d_2$ is greater than $d_1$. The throughput for the first gateway 702 and the second gateway 706 can be the same. To achieve the same throughput, in FIG. 7 the first gateway 702 communicates with the cell site 712 using a first MCS (25 in the example of FIG. 7) and the second gateway 706 communicates with the cell site 712 using a second MCS (5 in the example of FIG. 7). The first gateway 702 can use 5 PRBs to achieve the same throughput as the second gateway 706, which uses 10 PRBs. Thus, to provide the same throughput to the second gateway 706, twice as many PRBs are used given the same downlink traffic amount is requested by the first gateway 702 and the second gateway 706. The plot 710 schematically illustrates PRB usage as a function of MCS.

While in FIG. 7, the illustrated difference between the first service area element 704 and the second service area element 708 is distance from the cell site 712, it will be appreciated that distance alone may not be the sole factor and may not be determinative. For example, a closer service area element may have more obstructions in the way that can deflect or absorb radio signals, may have more electronic devices that produce radio interference, and so forth, such that a closer service area element can require the same number of PRBs or even more PRBs to achieve the same throughput as a more remote service area element.

Figure 8:
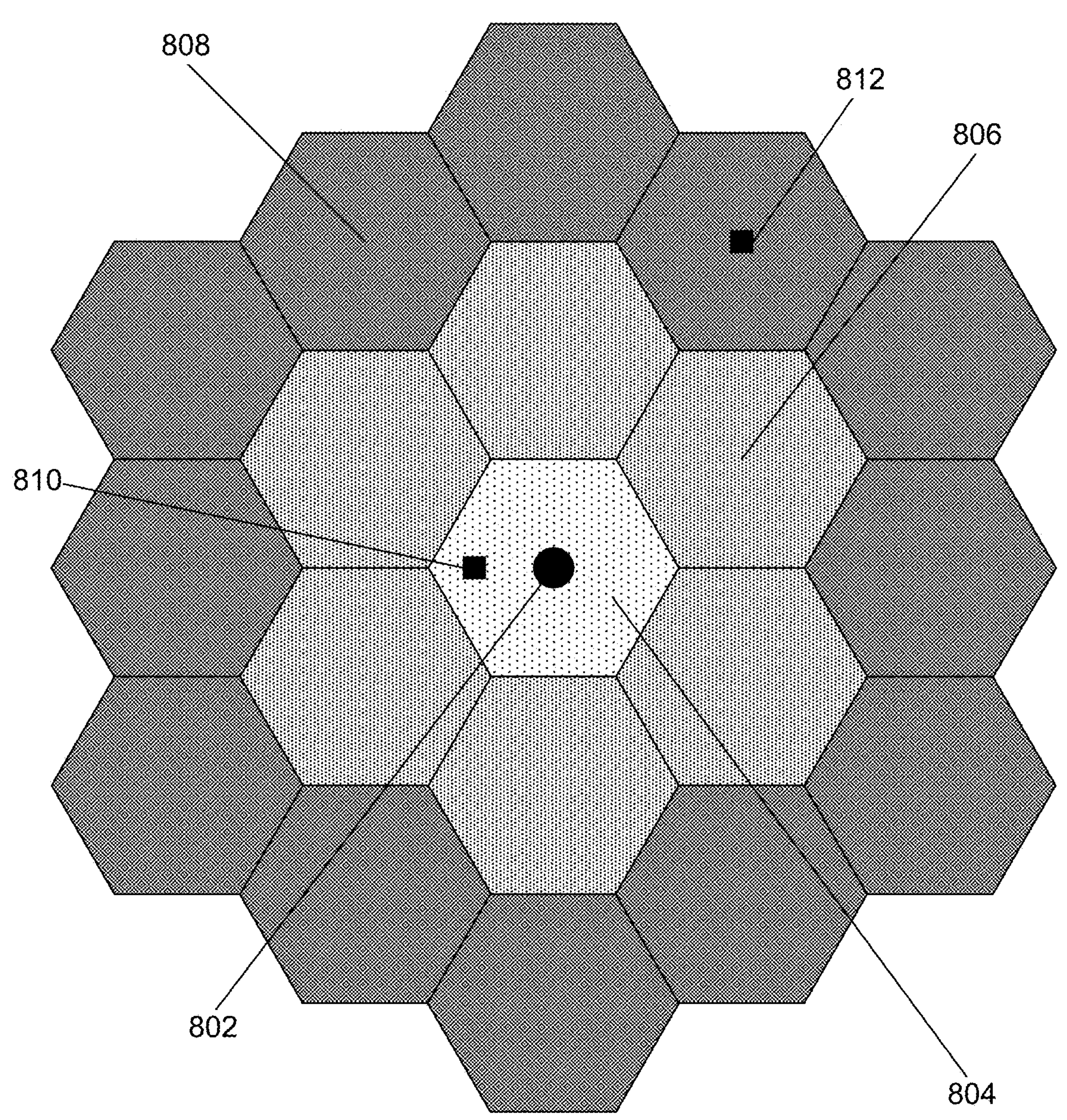
FIG. 8 is a diagram that schematically illustrates network resource usage according to some implementations.

FIG. 8 is a diagram that schematically illustrates PRB usage according to some implementations. In FIG. 8, the number of PRBs is a function of distance from a cell site 802 and PRB usage is symmetric about the cell site 802. In practice, as discussed herein, PRB usage may not be symmetric. For example, topography, physical obstructions, interference sources, antenna orientation, and so forth can impact PRB usage. In FIG. 8, a first service area element 804 located closest to the cell site 802 requires fewer network resources than a second set of service area elements 806 located a greater distance from the cell site 802, which requires fewer network resources than a third set of service area elements 808 located a greater still distance from the cell site 802, to achieve the same throughput. A first gateway 810 located in the first service area element 804 can consume significantly fewer network resources than a second gateway 812 located in the third set of service area elements 808 to achieve the same throughput.

As described herein, after determining which service area elements are eligible for wireless HSI service (e.g., based on throughput, churn, commitments and constraints, and/or growth data), a wireless telecommunications service can determine how to divide up available network resources among the eligible service area elements.

Figure 9:
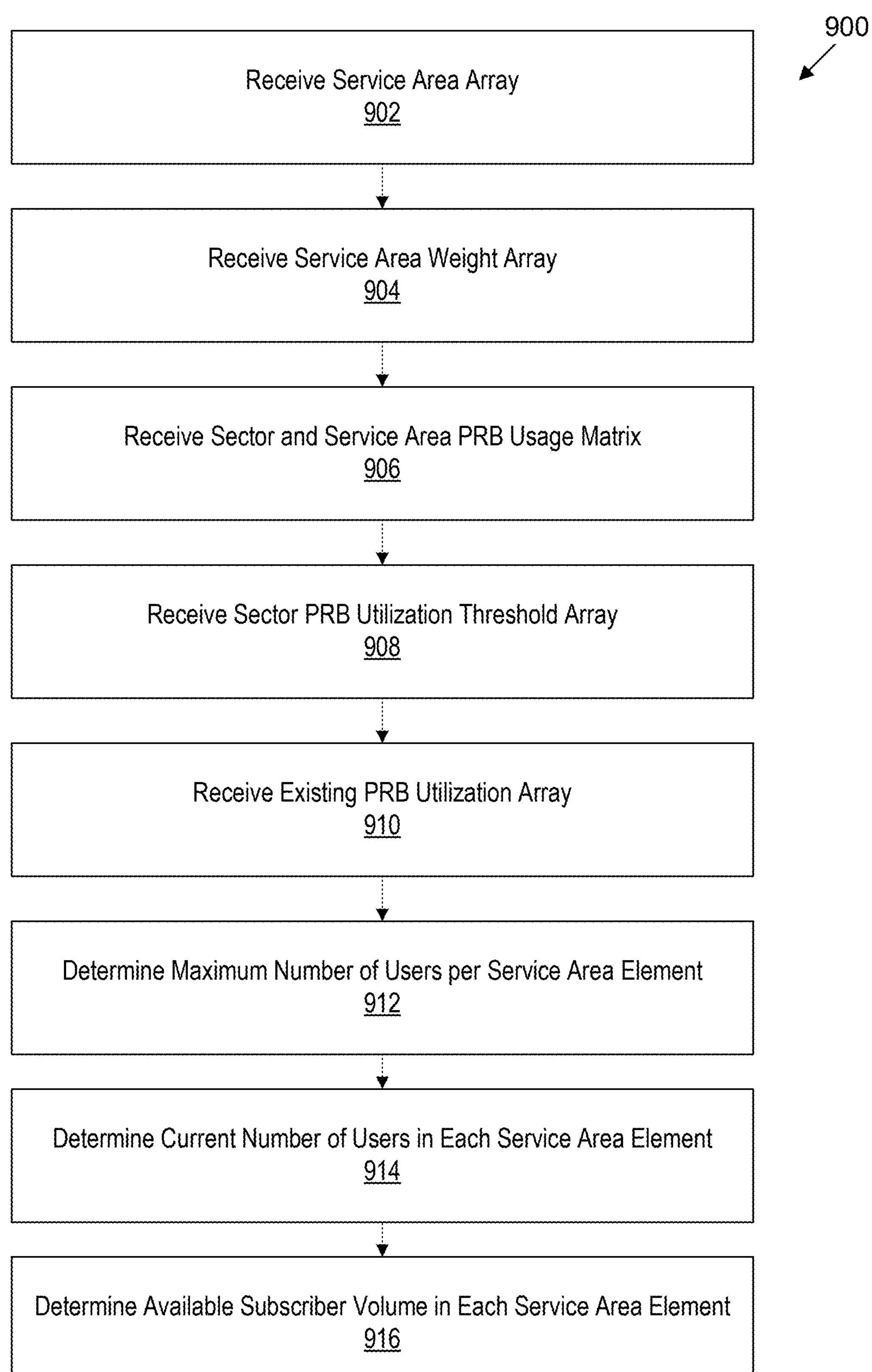
FIG. 9 is a flowchart that illustrates an example process for allotting network resources according to some implementations.

FIG. 9 is a flowchart that illustrates an example process for determining whether subscriptions should be offered and if so, how many subscriptions to offer, in a plurality of service area elements. In some implementations, the process of FIG. 9 can be carried out a sector level, cell level, or any other level. In some implementations, the process 900 of FIG. 9 can be carried out for an entire network, for example a nationwide network.

At step 902, a computing system can receive a service area array. The service area array can include a plurality of service area elements. At step 904, the computing system can receive a service area weight array. The service area weight array can include a weight assigned to each service area element. A low weight can indicate a preference to deprioritize a service area element relative to another service area element with a higher weight. In some implementations, a weight of zero can indicate that service should not be offered in a service area element even though the service area element can support wireless HSI. The weights can be used to prioritize allocation of network resources to achieve a desired allocation of network resources among eligible service area elements, for example to achieve goals such as offering service in rural areas with fewer wired internet options, to maximize the number of subscribers, etc. At step 906, the computing system can receive a sector and service area PRB usage matrix. For example, when multiple sectors are included, each sector can be a row and each service area element can be a column. The matrix can indicate how much each service area elements contributes to PRB usage for the sector. At step 908, the computing system can receive a sector PRB utilization threshold array. The utilization threshold array can indicate a maximum utilization within each sector. For example, a value of 1 can indicate that all available resources can be used. It can be desirable to limit the utilization threshold to less than 100%, for example to reduce the likelihood that subscribers encounter connectivity or throughput issues during periods of high demand. The utilization threshold can be, for example, 50%, 60%, 70%, 80%, 90%, 100%, or any other value. At step 910, the computing system can receive an existing PRB utilization array. The existing PRB utilization array can be an array indicating the current PRB utilization for each sector. In some implementations, the existing PRB utilization array can be based on average usage, peak usage, usage during certain time periods, and so forth. The difference between the sector PRB utilization array and the existing PRB utilization array can indicate how many network resources (e.g., PRBs) are available to be used for offering wireless HSI.

At step 912, the computing system can, using the service array area, service area weight array, sector and service area PRB usage matrix, sector PRB utilization threshold array, and existing PRB utilization array, determine a maximum number of wireless HSI users or subscribers per service area element. In some implementations, wireless HSI can already be offered in a service area element, and their usage can be included in the existing PRB utilization array. In some implementations, wireless HSI resource usage may not be included in the existing PRB utilization array. In some implementations, wireless HSI may not currently be offered in a service area element. At step 914, the computing system can determine a current number of users in each service area element and, at step 916, can determine a number of available subscribers in each service area element. When a new subscriber signs up for service, the available subscriber volume can be decreased by one and the current number of users can be increased by one, thereby reflecting the current number of subscribers and the current availability of new subscriptions.

In the above description, PRB usage was used to determine available subscriptions in different service area elements. However, other metrics can be used in other implementations. Further, while in the above, the number of subscribers is increased by one and the number of available subscriptions is decreased by one when a new subscriber signs up for service, it will be appreciated that this is not necessarily the case. For example, in some implementations, wireless HSI can be offered in different tiers, and the decrease in available subscriptions can be different depending on the tier selected by a new subscriber. As an illustrative example, service can be offered with a bandwidth of 25

Mbps, 50 Mbps, and 100 Mbps. A subscriber who selects 100 Mbps service can consume more available subscriptions than a subscriber who selects 25 Mbps service or 50 Mbps service.

Figure 10:
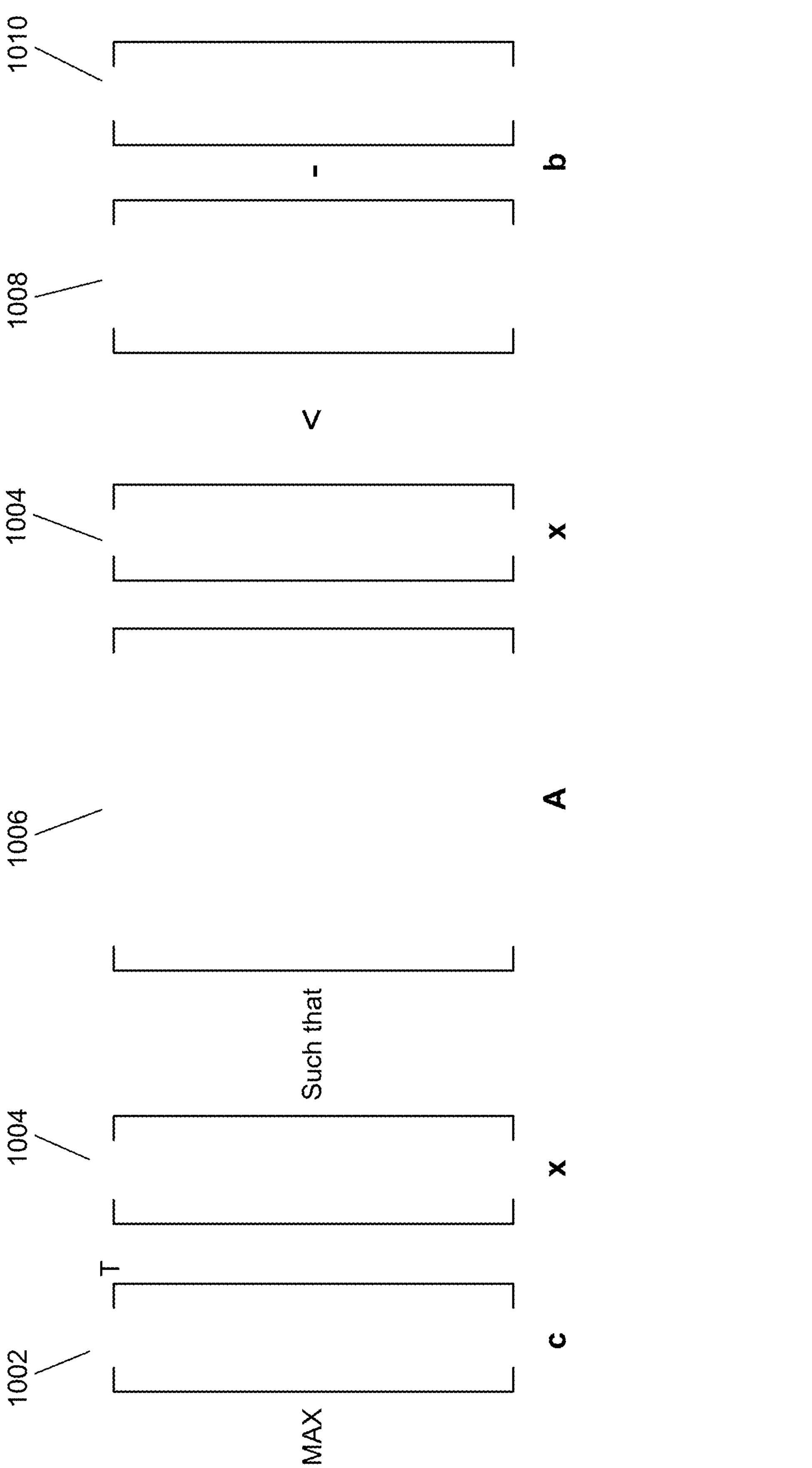
FIG. 10 shows an example multi-integer linear programming problem that can be solved to determine a number of available subscriptions according to some implementations.

In some implementations, allocating resources among service area elements can be approached as a mixed integer linear programming (MILP) problem. FIG. 10 shows an example MILP problem that can be solved to determine the available number of subscriptions in each service area element of a plurality of service area elements. The matrix c 1002 can include a plurality of weights for a plurality of service area elements. The matrix x 1004 can be a matrix indicating the number of available subscriptions in each service area element. The matrix x can be unknown and can be determined by solving the MILP problem. The matrix A 1006 can be a matrix that indicates sector PRB usage for a plurality of service area elements. In some implementations, the A matrix 1006 can be a sparse matrix. For example, if the matrix includes a plurality of sectors and a plurality of service area elements, the value of the matrix can be zero for all service area elements outside of a given sector in a particular row. The matrix b can be a matrix determined by subtracted the matrix 1010 from the matrix 1008. The matrix 1008 can indicate the maximum or threshold utilization for each sector. The matrix 1010 can indicate the current utilization for each sector. The MILP problem can then be written as max $c^T$ x such that Ax<b, where T indicates a transpose operation. In some implementations, the matrices c, x, and b can be column vectors. In some implementations, the MILP problem can be further restricted by placing an upper and/or lower bound on the elements in x. For example, an upper bound can indicate that no more than a maximum number of subscriptions should be offered in any service area element, even if an element can support more subscriptions. A lower bound can indicate that no fewer than a minimum number of subscriptions should be offered in any service area element, even if the weights in the c matrix would otherwise lead to a result in which fewer than the minimum number of subscriptions would be offered in one or more service area elements.

Computer System

Figure 11:
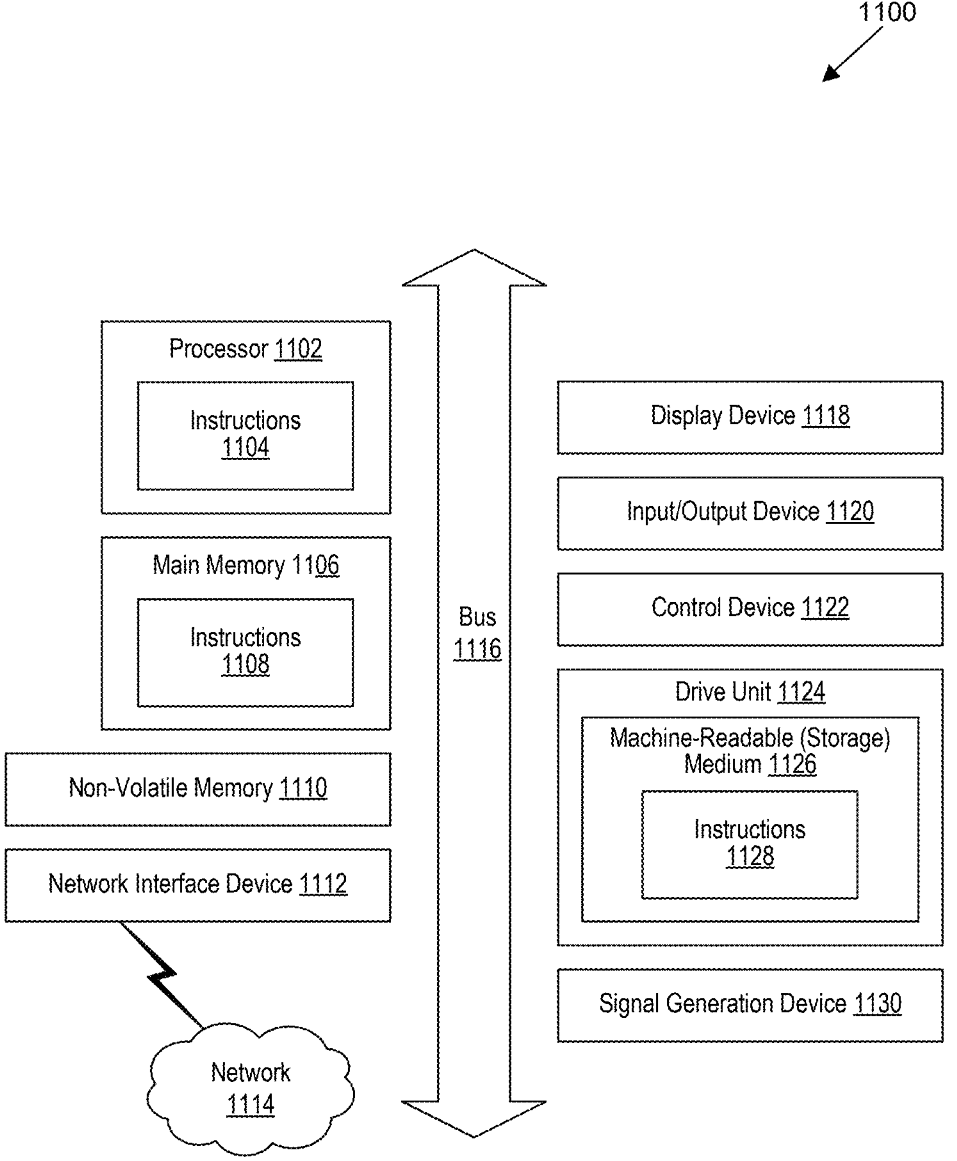
FIG. 11 is a block diagram that illustrates an example of a computer system 1100 in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, a video display device 1118, an input/output device 1120, a control device 1122 (e.g., keyboard and pointing device), a drive unit 1124 that includes a machine-readable (storage) medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementations, the computer system 1100 can be an embedded computer system, a system-on-chip (SOC), a single-board computer system (SBC), or a distributed system such as a mesh of computer systems, or it can include one or more cloud components in one or more networks. Where appropriate, one or more computer systems 1100 can perform operations in real time, in near real time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A computer-implemented method for determining eligibility for a resource-limited service, the method comprising:

dividing a service area into a plurality of service grid elements;

determining, for each service grid element using a throughput model, a predicted throughput of the resource-limited service, wherein the throughput model comprises a regression model configured to receive network data indicative of network performance and to output the predicted throughput;

determining, for each service grid element using a churn model, a predicted churn time of a subscriber of the resource-limited service, wherein the churn model comprises a classification model configured to receive customer data indicative of a likelihood that a customer terminates service and to output the predicted churn time;

providing the predicted throughput and the predicted churn time to an eligibility determination engine; and determining an eligibility for the resource-limited service for each service grid element, wherein determining the eligibility comprises determining that the predicted throughput is above a threshold value and the predicted churn time is above a threshold value.

2. The computer-implemented method of claim 1, wherein the eligibility determination engine is further provided with traffic growth data and constraints data, wherein the traffic growth data and the constraints data are used by the eligibility determination engine in conjunction with the predicted throughput and the predicted churn time to determine the eligibility for the resource-limited service.

3. The computer-implemented method of claim 1, wherein the throughput model is trained using network data to output the predicted throughput of the resource-limited service, wherein the network data comprises at least one of: sector band data, sector vendor data, sector bandwidth data, sector block error rate, sector radio resource control data, sector carrier aggregation data, sector E-UTRAN New Radio dual connectivity data, sector standalone 5G data, sector physical resource block utilization data, sector rank indicator data, sector quality of service class identifier data, sector modulation and control stream data, cell band data, cell vendor data, cell bandwidth data, cell block error rate, cell radio resource control data, cell carrier aggregation data, cell E-UTRAN New Radio dual connectivity data, cell standalone 5G data, sector physical resource block utilization data, cell rank indicator data, cell quality of service class identifier data, cell modulation and control stream data, service grid element reference signal received power, service grid element reference signal received quality, high speed internet device speed, high speed internet device latency, high speed internet device signal-interference-noise ratio, high speed internet device received signal strength indicator, high speed internet device reference signal received power, high speed internet device reference signal received quality, high speed internet device uptime, or high speed internet device mode.

4. The computer-implemented method of claim 1, wherein the churn model is trained on customer data, and wherein the customer data comprises one or more of: customer attributes, care call logs, or life cycle information.

5. The computer-implemented method of claim 2, wherein the traffic growth data comprises at least one of: historical growth data or projected growth data.

6. The computer-implemented method of claim 1, further comprising determining, for each service area element, a number of available subscriptions, wherein determining the number of available subscriptions comprises solving a mixed integer linear programming problem.

7. The computer-implemented method of claim 6, wherein the mixed integer linear programming problem comprises an array of weights, the array of weights comprising a weight for each service area element, and wherein the array of weights represents a prioritization for distributing the number of available subscriptions among the service area elements.

8. The computer-implemented method of claim 6, wherein determining the number of available subscriptions comprises determining that a resulting network load will not exceed a threshold capacity utilization.

9. The computer-implemented method of claim 8, wherein the resulting network capacity utilization comprises a current network capacity utilization and a projected new subscriber capacity utilization.

10. The computer-implemented method of claim 6, further comprising:

determining that a new subscription has been created; and reducing the number of available subscriptions by at least one.

11. The computer-implemented method of claim 7, wherein the array of weights is configured to optimize at least one of: a maximum number of available sign ups, a minimum amount of churn, a maximum supportability, a maximum robust supportability, or a business priority.

12. A system comprising:

at least one hardware processor;

at least one non-transitory memory storing instructions executable by the at least one hardware processor; and an eligibility module embodied in the at least one non-transitory memory and configured to cause the system to:

divide a service area into a plurality of service grid elements;

determine, for each service grid element using a throughput model, a predicted throughput of a resource-limited service, wherein the throughput model comprises a regression model configured to receive network data indicative of network performance and to output the predicted throughput determine, for each service grid element using a churn model, a predicted churn time of a subscriber of the resource-limited service, wherein the churn model comprises a classification model configured to receive customer data indicative of a likelihood that a customer terminates service and to output the predicted churn time;

provide the predicted throughput and the predicted churn time to an eligibility determination engine; and determine an eligibility for the resource-limited service for each service grid element, wherein determining the eligibility comprises determining that the predicted throughput is above a threshold value and the predicted churn time is above a threshold value.

13. The system of claim 12, wherein the eligibility determination engine is further provided with traffic growth data and constraints data, wherein the traffic growth data and the constraints data are used by the eligibility determination engine in conjunction with the predicted throughput and the predicted churn time to determine the eligibility for the resource-limited service.

14. The system of claim 12, further comprising a supportability module, the supportability module configured to determine, for each service area element, a number of available subscriptions, wherein determining the number of available subscriptions comprising a mixed integer linear programming problem.

15. The system of claim 14, wherein the mixed integer linear programming problem comprises an array of weights, the array of weights comprising a weight for each service area element, wherein the array of weights represents a prioritization for distributing the number of available subscriptions among the service area elements.

16. The system of claim 14, wherein determining the number of available subscriptions comprises determining that a resulting network load will not exceed a threshold capacity utilization.

17. A non-transitory, computer-readable storage medium comprising instructions recorded thereon, wherein the instructions when executed by at least one data processor of a system, cause the system to:

divide a service area into a plurality of service grid elements;

determine, for each service grid element using a throughput model, a predicted throughput of a resource-limited service, wherein the throughput model comprises a regression model configured to receive network data indicative of network performance and to output the predicted throughput determine, for each service grid element using a churn model, a predicted churn time of a subscriber of the resource-limited service, wherein the churn model comprises a classification model configured to receive customer data indicative of a likelihood that a customer terminates service and to output the predicted churn time;

provide the predicted throughput and the predicted churn time to an eligibility determination engine; and determine an eligibility for the resource-limited service for each service grid element, wherein determining the eligibility comprises determining that the predicted throughput is above a threshold value and the predicted churn time is above a threshold value.

18. The non-transitory, computer-readable storage medium of claim 17, wherein the eligibility determination engine is further provided with traffic growth data and constraints data, wherein the traffic growth data and the constraints data are used by the eligibility determination engine in conjunction with the predicted throughput and the predicted churn time to determine the eligibility for the resource-limited service.

19. The non-transitory, computer-readable storage medium of claim 17, wherein the instructions when executed by the at least one data processor of the system, cause the system to:

determine, for each service area element, a number of available subscriptions, wherein determining the number of available subscriptions comprises solving a mixed integer linear programming problem.

20. The non-transitory, computer-readable storage medium of claim 19, wherein determining the number of available subscriptions comprises determining that a resulting network load will not exceed a threshold capacity utilization.

* * * * *